(12) United States Patent
Seth et al.

(10) Patent No.: US 8,568,848 B2
(45) Date of Patent: Oct. 29, 2013

(54) BLENDED FLUOROSILICONE RELEASE MATERIALS

(75) Inventors: Jayshree Seth, Woodbury, MN (US); Zai-Ming Qiu, Woodbury, MN (US); Marie A. Boulos, West St. Paul, MN (US); Michael A. Semonick, White Bear Lake, MN (US); Ramesh C. Kumar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 243 days.

(21) Appl. No.: 13/139,378

(22) PCT Filed: Dec. 14, 2009

(86) PCT No.: PCT/US2009/067855
§ 371 (c)(1),
(2), (4) Date: Jun. 13, 2011

(87) PCT Pub. No.: WO2010/077811
PCT Pub. Date: Jul. 8, 2010

(65) Prior Publication Data
US 2011/0244226 A1 Oct. 6, 2011

Related U.S. Application Data

(60) Provisional application No. 61/138,186, filed on Dec. 17, 2008.

(51) Int. Cl.
*B32B 27/32* (2006.01)
*B32B 9/04* (2006.01)
*C08F 12/20* (2006.01)
*C08F 14/18* (2006.01)

(52) U.S. Cl.
USPC .......................... 428/41.4; 428/447; 526/242

(58) Field of Classification Search
None
See application file for complete search history.

(56) References Cited

U.S. PATENT DOCUMENTS

| | | | |
|---|---|---|---|
| 4,260,698 A | | 4/1981 | Tatemoto et al. |
| 4,450,263 A | | 5/1984 | West |
| 5,073,422 A | * | 12/1991 | Konno et al. ............... 428/40.7 |
| 5,082,706 A | | 1/1992 | Tangney |
| 5,132,366 A | | 7/1992 | Kashida et al. |
| 5,356,719 A | * | 10/1994 | Hamada et al. ............... 428/447 |
| 5,446,118 A | * | 8/1995 | Shen et al. .................... 526/245 |
| 5,447,987 A | | 9/1995 | Sato et al. |
| 5,482,991 A | * | 1/1996 | Kumar et al. ................. 524/506 |
| 5,492,969 A | | 2/1996 | Hamada et al. |
| 5,578,381 A | | 11/1996 | Hamada et al. |
| 6,730,397 B2 | | 5/2004 | Melancon et al. |
| 7,199,197 B2 | | 4/2007 | Caldwell et al. |
| 7,268,197 B2 | | 9/2007 | Moore et al. |
| 7,279,210 B2 | | 10/2007 | Hulteen et al. |
| 7,291,688 B2 | | 11/2007 | Qiu et al. |
| 7,345,123 B2 | | 3/2008 | Qiu et al. |
| 7,371,464 B2 | | 5/2008 | Sherman et al. |
| 7,651,740 B2 | * | 1/2010 | Kaplan et al. ............. 427/385.5 |
| 2005/0038217 A1 | | 2/2005 | Ahn et al. |
| 2007/0069187 A1 | | 3/2007 | Tonge |
| 2007/0161749 A1 | | 7/2007 | Hartmann et al. |

FOREIGN PATENT DOCUMENTS

| | | |
|---|---|---|
| EP | 1 351 144 | 4/1974 |
| EP | 0 488 709 | 6/1992 |
| EP | 0 545 659 | 6/1993 |
| EP | 0 656 391 | 6/1995 |
| EP | 0 671 434 | 9/1995 |

OTHER PUBLICATIONS

PCT International Search Report, PCT/US2009/067855, dated Jun. 2, 2010, 4 pages.

* cited by examiner

*Primary Examiner* — Robert S Loewe
(74) *Attorney, Agent, or Firm* — Dena M. Ehrich

(57) ABSTRACT

Blended release materials including a blend of a fluoro-functional silicone release polymer and a fluoropolymer are described. Exemplary fluoropolymers include fluoroolefin-based polymers and linear fluoropolymers including linear fluoroacryaltes. Articles including such release materials such as release liners, and adhesive articles, including silicone adhesive articles, are also described.

11 Claims, 1 Drawing Sheet

BLENDED FLUOROSILICONE RELEASE MATERIALS

CROSS REFERENCE TO RELATED APPLICATIONS

This application is a national stage filing under 35 U.S.C. 371 of PCT/US2009/067855, filed Dec. 14, 2009, which claims priority to U.S. Provisional Application No. 61/138,186, filed Dec. 17, 2008, the disclosure of which is incorporated by reference in its/their entirety herein.

FIELD

The present disclosure relates to release materials comprising a fluorosilicone release polymer blended with at least one additional fluoropolymer. Exemplary fluoropolymers include fluoroolefin-based polymers and linear acrylate polymers with pendant fluoroalkyl groups.

SUMMARY

Briefly, in one aspect, the present disclosure provides a release material comprising a blend of a fluoro-functional silicone release polymer and a second fluoropolymer. In some embodiments, the second fluoropolymer is a linear fluoropolymer. In some embodiments, the weight ratio of the fluoro-functional silicone release polymer to the linear fluoropolymer is no greater than 10:1. In some embodiments, the weight ratio of the fluoro-functional silicone release polymer to the linear fluoropolymer is no greater than no greater than 1:10.

In some embodiments, the linear fluoropolymer is a non-silicone, linear fluoropolymer. In some embodiments, the linear fluoropolymer is a fluoroacrylate polymer. In some embodiments, the fluoroacrylate polymer is derived from at least one C4MH monomer. In some embodiments, the linear fluoropolymer is a fluoroolefin-based polymer.

In another aspect, the present disclosure provides a release material comprising a blend of a fluoro-functional silicone release polymer and a fluoroolefin-based polymer. In some embodiments, the fluoroolefin-based polymer comprises the reaction product of at least one monomer selected from the group consisting of tetrafluoroethylene, hexafluoropropylene, vinyl fluoride, and vinylidene fluoride. In some embodiments, the fluoroolefin-based polymer is a terpolymer of tetrafluoroethylene, hexafluoropropylene, and vinylidene fluoride.

In some embodiments, the fluoroolefin-based polymer is an elastomeric fluoroolefin-based polymer. In some embodiments, the fluoroolefin-based polymer is a thermoplastic fluoroolefin-based polymer.

In another aspect, the present disclosure provides release liners comprising a substrate and the release material according to the present disclosure bonded to a major surface of the substrate.

In yet another aspect, the present disclosure provides adhesive articles comprising an adhesive having a first major surface and a second major surface, wherein the first major surface of the adhesive is in contact with a release material according to the present disclosure. In some embodiments, the adhesive articles further comprise a first substrate having a first major surface and a second major surface, wherein the release material is bonded to the first major surface of the first substrate. In some embodiments, the second major surface of the adhesive is in contact with the second major surface of the first substrate. In some embodiments, the second major surface of the adhesive is in contact with a second, independently selected release material bonded to the second major surface of the first substrate. In some embodiments, the adhesive articles further comprise a second substrate, wherein the second major surface of the adhesive is in contact with a major surface of the second substrate.

In some embodiments, the adhesive comprises a silicone adhesive. In some embodiments, the silicone adhesive comprises a poly(diorganosiloxane). In some embodiments, the silicone adhesive comprises a polydiorganosiloxane-polyurea block copolymer. In some embodiments, the silicone adhesive comprises a polydiorganosiloxane-polyoxamide copolymer. In some embodiments, the silicone adhesive further comprises a tackifier.

In another aspect, the present disclosure providers a coating comprising a release material according to the present disclosure.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
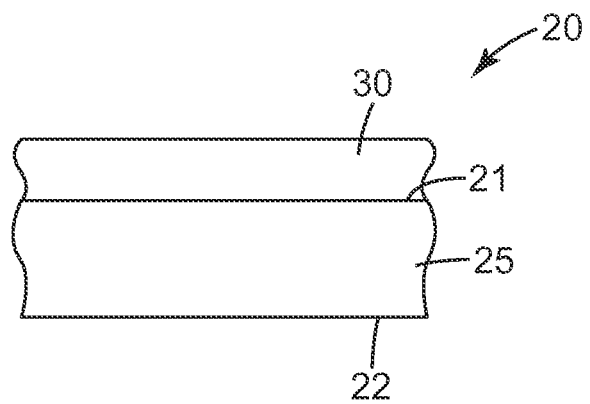
FIG. 1 illustrates a release liner according to some embodiments of the present disclosure.

Pressure sensitive adhesives (PSAs) are an important class of materials. Generally, PSAs adhere to a substrate with light pressure (e.g., finger pressure) and typically do not require any post-curing (e.g., heat or radiation) to achieve their maximum bond strength. A wide variety of PSA chemistries are available. Silicone PSAs offer one or more of the following useful characteristics: adhesion to low surface energy (LSE) surfaces, quick adhesion with short dwell times, wide use temperature (i.e., performance at high and low temperature extremes), weathering resistance (including resistance to ultraviolet (UV) radiation, oxidation, and humidity), reduced sensitivity to stress variations (e.g., mode, frequency and angle of applied stresses), and resistance to chemicals (e.g., solvents and plasticizers) and biological substances (e.g., mold and fungi).

Fluorinated release coatings are often used with silicone PSAs to provide desired release properties. In some embodiments, the desired release force is no greater than 50 g/25 mm, e.g., no greater than 30 g/25 mm at 180° peel angle and 230 cm/min (90 inches/min). However, the selection of fluorinated release coatings available to achieve the desired release performance is limited, particularly for wet-cast (e.g., solvent-based, water-based, and hot melt coated) silicone PSAs. For example, few release materials provide stable, consistent, smooth release of a wet-cast silicone adhesive.

The most common fluorinated release coatings are fluorosilicone materials. However, commercially available fluorosilicone release coatings are typically more expensive that silicone release materials and many common fluorinated materials.

The present inventors have discovered that fluorosilicone release materials can be blended with one or more additional fluorinated materials (e.g., a fluoropolymer) while maintaining the desired low release characteristics of the fluorosilicone material, even when the additional fluorinated material itself is not a release material. In addition, in some embodiments, high blend ratios may be used without detrimentally affecting the readhesion force of the adhesive after removal for the blended release materials of the present disclosure.

Generally, any known fluorosilicone release polymer may be used. The term "fluorosilicone" means a silicone material comprising at least some fluorine atoms.

Exemplary fluorosilicone release coatings include release coating compositions derived from organopolysiloxanes having fluorine containing organic groups and alkenyl groups an organohydrogensiloxane crosslinking agent and a platinum-containing catalyst. Other fluorosilicone release coatings may be derived from, e.g., organopolysiloxanes having fluorine containing organic groups and silicon-bonded hydrogen groups, an alkenyl functional organopolysiloxane and a platinum-containing catalyst.

A number of useful commercially available fluorosilicone polymers are available from Dow Corning Corp. (Midland, Mich.) under the SYL-OFF and the SYL-OFF ADVANTAGE series of trade designations including, e.g., SYL-OFF Q2-7785 and SYL-OFF Q2-7786. These fluorosilicone polymers are particularly useful in forming release coating compositions when combined with a suitable crosslinking agent. One useful crosslinking agent is available under the SYL-OFF Q2-7560 trade designation from Dow Corning Corp. Other useful crosslinking agents are disclosed in U.S. Pat. No. 5,082,706 (Tangney) and U.S. Pat. No. 5,578,381 (Hamada et al.). Other fluorosilicone polymers are commercially available from General Electric Co. (Albany, N.Y.), Wacker Chemie (Germany), Akrosil (Menasha, Wis.), and Loparex (Willowbrook, Ill.).

Exemplary fluoropolymers that may be blended with the fluorosilicone release polymer include additional fluorosilicone polymers, including those described herein, as well as non-silicone fluoropolymers.

Fluoropolymers can be prepared from a wide variety of fluorinated and non-fluorinated monomers. As used herein, the term "fluorinated" includes both perfluorinated and partially-fluorinated materials.

One class of fluoropolymers is based upon fluorinated olefinic monomers such as tetrafluoroethylene (TFE), hexafluoropropylene (HFP), vinyl fluoride (VF), vinylidene and fluoride (VDF). In some embodiments, the fluoroolefin-based fluoropolymers may be homopolymers or copolymers of fluorinated olefinic monomers. In some embodiments, the fluoroolefin-based fluoropolymers may be copolymers of one or more fluorinated olefinic monomers and one or more other monomers, including, e.g., non-fluorinated olefins such as ethylene, chlorinated olefins such as chlorotrifluoroethylene, and fluorinated vinyl ethers such as trifluoromethylvinylether.

In some embodiments, the fluoroolefin-based polymers may be amorphous fluoropolymers. As used herein, amorphous fluoropolymers are materials that exhibit essentially no crystallinity or possess no significant melting point as determined for example by differential scanning calorimetry (DSC). In some embodiments, the amorphous fluoropolymers are elastomeric. In some embodiments the elastomeric fluoropolymers may comprise, e.g., interpolymerized units derived from VDF, HFP, and, optionally, TFE monomers. Examples of such are commercially available from 3M Company under the trade names Dyneon™ Fluoroelastomer FC 2145 and FT 2430. Additional amorphous fluoropolymers include, e.g., VDF-chlorotrifluoroethylene copolymers, commercially available under the trade name Kel-F™ 3700, from 3M Company.

In some embodiments, the fluoroolefin-based polymers may be homopolymers and copolymers that do exhibit crystalline melting point. Exemplary crystalline fluoropolymers include those based on fluorinated monomers such as TFE or VDF such as polyvinylidene fluoride (PVDF), available commercially from 3M Company as Dyneon™ PVDF, or thermoplastic copolymers of TFE such as those based on the crystalline microstructure of TFE-HFP-VDF, e.g., those available from 3M under the trade name Dyneon™ Fluoroplastic THV™ 220.

In some embodiments, the fluoroolefin-based polymers may include PVDF-containing fluoroplastic materials having very low molar levels of HFP such as those sold under the trade name Dyneon™ PVDF 6010 or 3100, available from Dyneon LLC, of St. Paul, Minn.; and Kynar™ 740, 2800, 9301, available from Elf Atochem North America Inc.

A separate class of fluoropolymers useful in some embodiments of the present disclosure are fluoroacrylate polymers, which are based upon (meth)acrylates (i.e., acrylates and/or methacrylates) having pendant fluoroalkyl groups. Fluoroacrylate polymers derived from fluoroacrylate monomers and multi-(meth)acrylates such a polyethylene glycol diacrylate (PEGDA) or 1,6-hexanediol diacrylate (HDDA) will form nonlinear (e.g., branched and/or crosslinked) fluoropolymers. Fluoroacrylate polymers derived from fluoroacrylate monomers and mono-(meth)acrylates such as C1-C50 acrylates (e.g., C4-C20 acrylates such as butyl acrylate, isooctyl acrylate, 2-ethylhexyl acrylate, and octadecyl acrylate) form linear fluoropolymers.

In some embodiments, the linear fluoroacrylate polymer comprises a reaction product of components comprising a fluoroacrylate monomer represented by the formula:

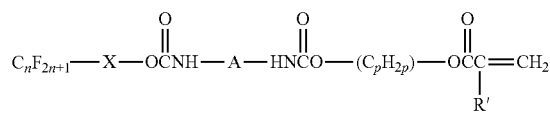

wherein, n is an integer in a range of from 1 to 6, inclusive. For example, n may be 1, 2, 3, 4, or 5;

p is an integer in a range of from 2 to 30, inclusive;

R' is H, CH$_3$, or F; and

X is

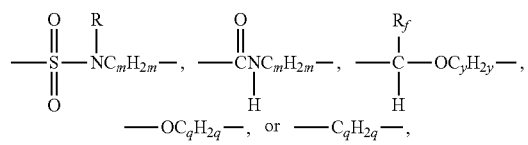

wherein:

R is H or an alkyl group having 1 to 4 carbon atoms (e.g., methyl, ethyl, isopropyl, butyl);

m is an integer in a range of from 2 to 8, inclusive;

R$_f$ is C$_n$F$_{2n+1}$, wherein n is as previously defined;

y is an integer in a range of from 0 to 6, inclusive; and q is an integer in a range of from 1 to 8, inclusive.

"A" represents a hydrocarbylene group, for example, methylene, ethylene, phenylene, or 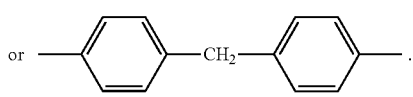

In some embodiments, the hydrocarbylene group may have less than 18, 16, 12, or even less that 7 carbon atoms. The hydrocarbylene group may be linear or branched and may contain one or more rings.

In some embodiments, n is 4, p is 2, A is

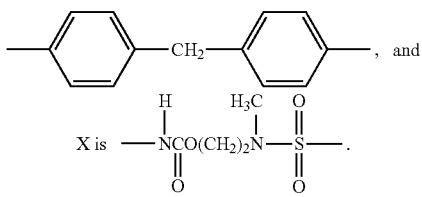

In such a case the fluoroacrylate monomer may be represented by the formula

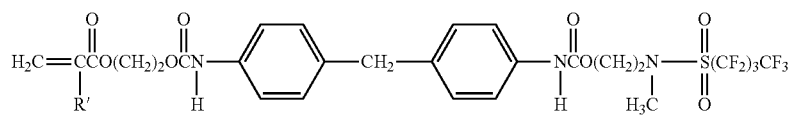

wherein R' is as previously defined. In the case that R' is H, the monomer is commonly referred to as MeFBSE-MDI-HEA, hereinafter referred to as "C4 MH".

Such fluoroacrylate monomers can be polymerized to yield a fluorinated acrylic polymer as described in U.S. Pat. No. 7,199,197. The fluoroacrylate monomers can also be copolymerized with one or more comonomers such as mono-(meth)acrylate monomers to produce linear fluoropolymers according to some embodiments of the present disclosure.

In some embodiments, the comonomer may be an alkyl mono-(meth)acrylate. In some embodiments, the alkyl mono-(meth)acrylate is a C1-C50, e.g., a C4 to C20, alkyl mono-(meth)acrylate. Representative examples of useful alkyl mono-(meth)acrylates include methyl(meth)acrylate, butyl (meth)acrylate, isobutyl (meth)acrylate, hexyl(meth)acrylate, dodecyl(meth)acrylate, octadecyl(meth)acrylate, and 2-ethylhexyl(meth)acrylate.

The ratio of fluorosilicone release polymer to fluoropolymer (e.g., linear fluoroacrylate polymer or fluoroolefinic polymer) can vary widely. For example, in some embodiments, the weight ratio of the fluoro-functional silicone release polymer to the linear fluoropolymer is no greater than 10:1, no greater than 5:1, or even no greater than 3:1. In some embodiments, it may be desirable to minimize the amount of the relatively expensive fluorosilicone material, while retaining the required release and readhesion properties. In some embodiments, the weight ratio of the fluoro-functional silicone release polymer to the linear fluoropolymer is no greater than 1:1, no greater than 1:5, no greater than 1:10, or even no greater than 1:20. For example, in some embodiments the weight ratio of the fluoro-functional silicone release polymer to the linear fluoropolymer is between 10:1 and 1:20, e.g., between 3:1 and 1:20, inclusive; between 2:1 and 1:10, inclusive (e.g., between 1:1 and 1:10, inclusive), or even between 2:1 and 1:3.

The blended release composition of the present disclosure may be useful with a wide variety of adhesives. Generally, fluorosilicone-based release materials are used with silicone adhesives. Examples of suitable silicone polymers include silicones, silicone polyurea block copolymers, polydiorganosiloxane polymers, silicone polyamides, polysiloxane grafted copolymers, and mixtures thereof.

One class of silicone adhesives includes those having a siloxane backbone, e.g., poly(diorganosiloxane) materials. Exemplary poly(diorganosiloxane) materials include poly(dialkyl siloxane), e.g., poly(dimethyl siloxane); poly(alkylaryl siloxane), e.g., poly(methylphenyl siloxane) and poly(dimethyldiphenyl siloxane); and poly(diaryl siloxane), e.g., poly(diphenyl siloxane). In some embodiments, the adhesive may comprise two or more poly(diorganosiloxane) materials.

Generally, the silicone-based pressure-sensitive adhesive composition includes a silicone polymer and optionally other components including, e.g., tackifying agents, plasticizers and combinations thereof. In some embodiments, the adhesives further comprise a suitable tackifier. Generally, any known tackifying resin may be used, e.g., in some embodiments, silicate tackifying resins may be used. In some exemplary adhesive compositions, a plurality of silicate tackifying resins can be used to achieve desired performance.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 to 50,000-gm/mole, e.g., 500 to 15,000 gm/mole and generally R' groups are methyl groups.

MQ silicate tackifying resins are copolymeric resins where each M unit is bonded to a Q unit, and each Q unit is bonded to at least one other Q unit. Some of the Q units are bonded to only other Q units. However, some Q units are bonded to hydroxyl radicals resulting in $HOSiO_{3/2}$ units (i.e., "$T^{OH}$" units), thereby accounting for some silicon-bonded hydroxyl content of the silicate tackifying resin.

MQD silicone tackifying resins are terpolymers having M, Q and D units. In some embodiments, some of the methyl R' groups of the D units can be replaced with vinyl ($CH2=CH—$) groups ("$D^{Vi}$" units). MQT silicate tackifying resins are terpolymers having M, Q and T units.

Suitable silicate tackifying resins are commercially available from sources such as Dow Corning (e.g., DC-7066), and Momentive Performance Materials (e.g., SR545 and SR1000).

One suitable silicone-based pressure-sensitive adhesive composition includes a MQ tackifying resin and a silicone polymer. The MQ tackifying resin and the silicone polymer can be present in the form of, e.g., a blend of MQ tackifying resin and silicone polymer, a reaction product of MQ tackifying resin and silicone polymer, e.g., a condensation cure or addition cure type reaction product, or a mixture thereof.

Another example of a useful class of silicone polymers is silicone polyurea block copolymers. Silicone polyurea block copolymers include the reaction product of a polydiorganosiloxane diamine (also referred to as silicone diamine), a diisocyanate, and optionally an organic polyamine.

Yet another example of a useful class of silicone polymers is polydiorganosiloxane-polyoxamide copolymer silicone adhesives. Useful polydiorganosiloxane-polyoxamide copolymer silicone adhesives are disclosed in, e.g., U.S. Pat. No. 7,371,464 (Sherman).

Wide ranges of commercially available silicone pressure-sensitive adhesive compositions are also suitable. Examples of such silicone pressure-sensitive adhesive compositions include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), and PSA 529, PSA 750-D1, PSA 825-D1, and PSA 800-C. Also useful are various blends of silicone pressure-sensitive adhesive compositions, such as blends of two different dimethylsiloxane-based silicone pressure-sensitive adhesive compositions, or blends of dimethylsiloxane-based silicone pressure-sensitive adhesive compositions with dimethylsiloxane/diphenylsiloxane-based pressure-sensitive adhesive compositions.

EXAMPLES

TABLE 1

Summary of Materials

| Trade Name | Description | Source |
|---|---|---|
| Q2-7735 | silicone pressure sensitive adhesive (polydimethylsiloxane gum and resin) | Dow Corning |
| Q2-7566 | silicone pressure sensitive adhesive (polydimethylsiloxane gum and resin) | Dow Corning |
| Q2-7785 | fluorosilicone release polymer | Dow Corning |
| Q2-7786 | fluorosilicone release polymer | Dow Corning |
| Q2-7560 | fluorofunctional silicone crosslinker | Dow Corning |
| DC-7066 | MQ silicate tackifying resin | Dow Corning |
| C4MH | $C_4F_9SO_2N(Me)C_2H_4OC(\!\!=\!\!O)NH\!-\!Ph\!-\!CH_2\!-\!Ph\!-\!NHC(\!\!=\!\!O)O\!-\!(CH_2)_2OC(\!\!=\!\!O)CH\!\!=\!\!CH_2$ | U.S. Pat. No. 7,199,197 |
| ODA | octadecyl acrylate | Aldrich |
| PEGDA | polyethylene glycol diacrylate | Aldrich |
| THV-tp | tetrafluoroethylene, hexafluoropropylene, vinylidene fluoride thermoplastic terpolymer (THV-220) | Dyneon, LLC |
| THV-el | tetrafluoroethylene, hexafluoropropylene, vinylidene fluoride elastomeric terpolymer (FT-2430) | Dyneon, LLC |
| PVDF | polyvinylidenefluoride (KYNAR 7201) | Elf Atochem, North America |
| MEK | methyethyl ketone | Omnisolv |
| EtOAc | ethyl acetate | J. T. Baker |

ADH-1. This poly(dimethyl siloxane) ("PDMS") based silicone adhesive was prepared as follows. A peroxide solution was made by adding 3.0 g of peroxide paste (SID 3352.0 from Gelest), 7.2 g of toluene and 1.8 g of MEK. The paste contained 50% dichlorobenzoyl peroxide and 50% silicone fluid. The resulting peroxide solution was 25% solids with a 80:20 weight ratio of toluene:MEK. 100 g of Q2-7735 silicone pressure-sensitive adhesive (56% solids), 58.6 g of toluene and 2.24 g of the peroxide solution were mixed. This yielded an adhesive solution containing 0.5 wt. % (based on adhesive solids) of active dichlorobenzoyl peroxide at a final solids content of 35%. The composition was put on a jar roller overnight to dissolve, producing the adhesive solution.

ADH-2. This PDMS-based silicone adhesive was prepared as described for ADH-1, except that 100 g of the Q2-7566 silicone pressure-sensitive adhesive (56% solids) was used.

ADH-3. This tackified, polydiorganosiloxane-polyurea block copolymer silicone adhesive was prepared as follows. A silicone polyurea pressure-sensitive adhesive was prepared according to the procedure provided in U.S. Pat. No. 6,730,397 in the section titled "Preparation of Silicone Polyurea Polymer," with the following exceptions. The silicone polyurea elastomer was prepared at 20% solids rather than 30%, and the elastomer was prepared in a solvent blend having a toluene/2-propanol weight ratio of 75/25 rather than 70/30. The resulting elastomer was formulated into a silicone polyurea pressure-sensitive adhesive composition by combining 63 parts by weight elastomer solution, 24.3 parts of an MQ resin, 11.63 parts toluene, and 1.08 parts 2-propanol, and mixing well to assure homogeneity. The MQ resin was treated to reduce the silanol content and consisted of M, Q, and $T^{OH}$ structural units, having an M/Q ratio of 1.2, SiOH content of 0.8%, Mn=2820, and Mw=4600, 63.4% solids by weight in xylene.

ADH-4. This tackified, polydiorganosiloxane-polyoxamide copolymer silicone adhesive was prepared as follows. A polydiorganosiloxane-polyoxamide copolymer was prepared according to the procedures set forth in U.S. Pat. No. 7,371,464 (Sherman). The copolymer was blended with 50 wt. % tackifier (DC-7066).

Sample Preparation. Samples were prepared for testing using either a Dry Lamination process or a Wet Casting process. For dry lamination the adhesive was coated on 50 micron (2.0 mil) primed PET film (product 3SAB from Mitsubishi) and dried. The adhesive of the resulting PET-backed tape was laminated to the release liner using two passes of a 2 kg rubber roller. For wet casting, the adhesive was coated directly on to the release coated liner and dried. The 50 micron PET film was then laminated to the dried adhesive forming the PET-backed tape adhered to a liner.

Release Test. The PET-backed tape samples were peeled from the liner at an angle of 180° and at a rate of 230 cm/min (90 inches/minute). An IMass model SP2000 peel tester obtained from IMASS, Inc., Accord, Mass., was used to record the peel force.

Readhesion Test. To determine the readhesion value, the PET-backed tape samples were peeled from the liner using the Release Test method and the tape was then applied to the surface of a clean stainless steel panel. The tape sample was rolled down against the panel by means of two passes (forward and back) with a 2 kg rubber roller at 61 cm/min (24 inches/min). The readhesion value was a measure of the force required to pull the tape from the steel surface at an angle of 180° at a rate of 30.5 cm/min (12 inches/minute). The IMass model SP2000 peel tester was used to record the peel force.

Comparative Example 1 (CE-1)

A fluorosilicone release polymer (Q2-7785) was combined with a fluoro-functional silicone crosslinker (Q2-7560) at a 97:3 weight ratio (collectively, "FS-1") in heptane to provide a 16 wt. % solids solution of FS-1 in a non-fluorinated solvent.

Comparative Example 2 (CE-2)

A 70:30 (by weight) copolymer of C4 MH and ODA was prepared according to Example 27 of U.S. Pat. No. 7,199,197.

The resulting C4 MH-ODA linear fluoroacrylate copolymer was diluted with toluene and EtOAc (1:1 weight ratio) to provide a 3 wt. % solids solution.

Example 1 (EX-1)

A 10 wt. % solution of FS-1 in EtOAc and heptane (4:1) ("SOLN-1") and a 10 wt. % solution of C4 MH-ODA linear fluoroacrylate copolymer in toluene and EtOAc (1:1 weight ratio) ("SOLN-2") were blended to achieve a 3:1 weight ratio of FS-1:C4 MH-ODA in the solvent mixture of heptane/toluene/EtOAc.

Example 2 (EX-2)

SOLN-1 and SOLN-2 were blended to achieve a 1:1 weight ratio of FS-1:C4 MH-ODA in the solvent mixture of heptane/toluene/EtOAc.

Example 3 (EX-3)

SOLN-1 and SOLN-2 were blended to achieve a 1:3 weight ratio of FS-1:C4 MH-ODA in the solvent mixture of heptane/toluene/EtOAc.

Each of these solvent-based release compositions was coated onto a polyester film using a Number 8 Meyer rod. The coated samples were then cured for 5 minutes at 120° C. The resulting release liners were evaluated using a variety of silicone adhesives to determine release and readhesion properties.

PET-backed silicone adhesive tapes were prepared using ADH-1. The Dry Lamination process was used to adhere the resulting tapes to the various liners. The resulting samples were aged for seven days at either 22° C. and 50% relative humidity ("7d-RT"), or at 70° C. ("7d-HT"). The peel force as measured according to the Release Test is shown in Table 2a.

The readhesion force of the adhesives peeled from the liners was evaluated using the Readhesion Test. The results are also summarized in Table 2a. For comparison, a sample of the PET-backed tape was laminated directly to a stainless steel panel. The adhesive of this tape was never in contact with a release material. This reference readhesion force was 1,850 g/25 mm.

TABLE 2a

Release and Readhesion results for dry laminated ADH-1 adhesive and a blend of a fluorosilicone release polymer and a linear fluoroacrylate polymer.

| Release material | Relative amount FS1:C4MH-ODA | Release (g/25 mm) | | Readhesion (g/25 mm) | |
|---|---|---|---|---|---|
| | | 7d-RT | 7d-HT | 7d-RT | 7d-HT |
| CE-1 | 1:0 | 11.5 | 14.2 | 1,690 | 1,820 |
| EX-1 | 3:1 | 12.6 | 15.9 | 1,590 | 1,740 |
| EX-2 | 1:1 | 12.7 | 17.9 | 1,670 | 1,680 |
| EX-3 | 1:3 | 27.9 | 25.3 | 1,930 | 1,900 |
| CE-2 | 0:1 | 99.6 | 76.6 | 1,680 | 1,810 |

PET-backed silicone adhesive tapes were prepared using ADH-1. The Wet Casting process was used to prepare tapes with various liners. The resulting samples were aged for seven days at either 22° C. and 50% relative humidity ("7d-RT"), or at 70° C. ("7d-HT"). The peel force as measured according to the Release Test is shown in Table 2b.

TABLE 2b

Release results for wet cast ADH-1 adhesive and a blend of a fluorosilicone release polymer and a linear fluoroacrylate polymer.

| Release material | Relative amount FS1:C4MH-ODA | Release (g/25 mm) | |
|---|---|---|---|
| | | 7d-RT | 7d-HT |
| CE-1 | 1:0 | 9.5 | 22.1 |
| EX-1 | 3:1 | 17.2 | 24.9 |
| EX-2 | 1:1 | 14.9 | 27.3 |
| EX-3 | 1:3 | 14.9 | 27.7 |
| CE-2 | 0:1 | Locked-up | Locked-up |

The wet cast sample prepared using the release liner of CE-2 locked-up, i.e., the adhesive tape could not be removed from the liner. Thus, although C4 MH-ODA alone did not function as a release material for wet cast adhesive ADH-1, good release was obtained even when significant amounts of this same linear fluoroacrylate copolymer were blended with the fluorosilicone, e.g., 1:3 of FS1:C4 MH-ODA.

PET-backed silicone adhesive tapes were prepared using ADH-3. The Dry Lamination process was used to adhere the resulting tapes to the various liners. The resulting samples were aged for seven days at either 22° C. and 50% relative humidity ("7d-RT"), or at 70° C. ("7d-HT"). The peel force as measured according to the Release Test is shown in Table 3a. The readhesion force of the adhesives peeled from the liners was evaluated using the Readhesion Test. The results are also summarized in Table 3a. For comparison, a sample of the PET-backed tape was laminated directly to a stainless steel panel. This reference readhesion force was 1,770 g/25 mm.

TABLE 3a

Release and Readhesion results for dry laminated ADH-3 adhesive and a blend of a fluorosilicone release polymer and a linear fluoroacrylate polymer.

| Release material | Relative amount FS1:C4MH-ODA | Release (g/25 mm) | | Readhesion (g/25 mm) | |
|---|---|---|---|---|---|
| | | 7d-RT | 7d-HT | 7d-RT | 7d-HT |
| CE-1 | 1:0 | 7.4 | 12.4 | 1,580 | 1,440 |
| EX-1 | 3:1 | 10.5 | 12.7 | 1,870 | 1,520 |
| EX-2 | 1:1 | 8.8 | 11.9 | 1,700 | 1,560 |
| EX-3 | 1:3 | 14.3 | 16.0 | 1,490 | 1,330 |
| CE-2 | 0:1 | 59.1 | 117.2 | 1,650 | 1,550 |

PET-backed silicone adhesive tapes were prepared using ADH-3. The Wet Casting process was used to prepare tapes with the various liners. The resulting samples were aged for seven days at either 22° C. and 50% relative humidity ("7d-RT"), or at 70° C. ("7d-HT"). The peel force as measured according to the Release Test is shown in Table 3b. Although C4 MH-ODA alone did not function as an acceptable release material, good release was obtained even when significant amounts of C4 MH-ODA are blended with the fluorosilicone, e.g., 1:3 of FS1:C4 MH-ODA.

TABLE 3b

Release results for wet cast ADH-3 adhesive
and a blend of a fluorosilicone release polymer
and a linear fluoroacrylate polymer.

| Release material | Relative amount FS1:C4MH-ODA | Release (g/25 mm) 7d-RT | Release (g/25 mm) 7d-HT |
|---|---|---|---|
| CE-1 | 1:0 | 7.5 | 10.5 |
| EX-1 | 3:1 | 9.8 | 11.3 |
| EX-2 | 1:1 | 8.5 | 10.7 |
| EX-3 | 1:3 | 9.5 | 10.9 |
| CE-2 | 0:1 | 2,770 | 1,630 |

Comparative Example 3 (CE-3)

A fluorosilicone release polymer (Q2-7786) was combined with a fluoro-functional silicone crosslinker (Q2-7560) at a 94:6 weight ratio (collectively, "FS-2") in HFE-7200 to provide a 10 wt. % solids solution of FS-2 in a fluorinated solvent.

Comparative Example 4 (CE-4)

FS-2 (94 parts by weight Q2-7786 and 6 parts by weight Q2-7560 crosslinker) were combined in EtOAc/Heptane/Toluene (3.6/1/1.2 by weight) to provide a 18 wt. % solids solution of FS-2 in a non-fluorinated solvent blend.

Comparative Example 5 (CE-5)

CE-5 was a 5 wt. % solids solution of a C4 MH-ODA copolymer (70:30 weight ratio) it EtOAc.

Example 4 (EX-4)

A 16 wt. % solids solution of FS-2 in EtOAc/Heptane (4/1 by weight) was combined with a 10 wt. % solids solution of a C4 MH-ODA copolymer (70:30 weight ratio) in EtOAc. The resulting 15 wt. % solids solution had an FS-2:C4 MH-ODA weight ratio of 84:16 (i.e., 5.25:1).

Example 5 (EX-5)

A 20 wt. % solids solution of FS-2 in EtOAc/Heptane (4/1 by weight) was combined with a 10 wt. % solids solution of a C4 MH-ODA copolymer (70:30 weight ratio) in EtOAc. The resulting 16 wt. % solids solution had an FS-2:C4 MH-ODA weight ratio of 75:25 (i.e., 3:1).

Example 6 (EX-6)

A 10 wt. % solids solution of FS-2 in EtOAc/Heptane (4/1) was combined with a 10 wt. % solids solution of a C4 MH-ODA copolymer (70:30 weight ratio) in EtOAc. The resulting 10 wt. % solids solution had an FS-2:C4 MH-ODA ratio of 50:50 (i.e., 1:1).

Example 7 (EX-7)

A 10 wt. % solids solution of FS-2 in EtOAc/Heptane (4/1 weight ratio) was combined with a 10 wt. % solids solution of a C4 MH-ODA copolymer (70:30 weight ratio) it EtOAc. The resulting 10 wt. % solids solution had an FS-2:C4 MH-ODA ratio of 25:75 (i.e., 1:3).

Each of these solvent-based release compositions was coated onto a polyester film using a Number 8 Meyer rod. The coated samples were then cured for 5 minutes at 120° C. The resulting release liners were evaluated using a variety of silicone adhesives to determine release and readhesion properties.

PET-backed silicone adhesive tapes were prepared using ADH-1. The Dry Lamination process was used to adhere the resulting tapes to the various liners. The resulting samples were aged for seven days at either 22° C. and 50% relative humidity ("7d-RT"), or at 70° C. ("7d-HT"). The peel force as measured according to the Release Test is shown in Table 4. The readhesion force of the adhesives peeled from the liners was evaluated using the Readhesion Test. The results are also summarized in Table 4. For comparison, a sample of the PET-backed tape was laminated directly to a stainless steel panel. The adhesive of this tape was never in contact with a release material. This reference readhesion force was 1,990 g/25 mm.

TABLE 4

Release and Readhesion results for dry laminated
ADH-1 adhesive and a blend of a fluorosilicone release
polymer and a linear fluoroacrylate polymer.

| Release material | Relative amount FS2:C4MH-ODA | Release (g/25 mm) 7d-RT | Release (g/25 mm) 7d-HT | Readhesion (g/25 mm) 7d-RT | Readhesion (g/25 mm) 7d-HT |
|---|---|---|---|---|---|
| CE-4 | 1:0 | 3.7 | 5.2 | 1,900 | 2,040 |
| CE-5 | 1:1 | 4.0 | 4.7 | 1,900 | 1,970 |
| EX-4 | 5.25:1 | 5.4 | 6.0 | 1,990 | 1,920 |
| EX-5 | 3:1 | 6.1 | 7.3 | 1,950 | 1,910 |
| EX-6 | 1:1 | 8.7 | 10.9 | 1,900 | 2,120 |
| EX-7 | 1:3 | 433 | 561 | 1,680 | 1,520 |
| CE-6 | 0:1 | 127 | 140 | 1,980 | 1,950 |

Example 8 (EX-8)

A 10 wt. % solids solution of FS-2 (94 parts by weight Q2-7786 and 6 parts by weight Q2-7560 crosslinker) in EtOAc/Heptane (4/1 weight ratio) was combined with a 10 wt. % solids solution in MEK of THV-tp (tetrafluoroethylene, hexafluoropropylene, vinylidene fluoride thermoplastic terpolymer (THV-220 from Dyneon, LLC)). The resulting 10 wt. % solids solution had an FS-2:THV-tp ratio of 1:1.

PET-backed silicone adhesive tapes were prepared using ADH-1. The Dry Lamination process was used to adhere the resulting tape to the liner of EX-7. The resulting samples were aged for seven days at either 22° C. and 50% relative humidity ("7d-RT"), or at 70° C. ("7d-HT"). The peel force was measured according to the Release Test and the readhesion force of the adhesives peeled from the liners was evaluated using the Readhesion Test. The 7d-RT aged sample had a release force 13.9 g/25 mm, and a readhesion force of 1,940 g/25 mm. The 7d-HT aged sample had a release force of 10.1 g/25 mm, and a readhesion force of 1,900 g/25 mm.

Comparative Example 7 (CE-7)

FS-1 (97 parts by weight Q2-7785 and 3 parts by weight Q2-7560 crosslinker) was prepared as a 10 wt. % solution in EtOAc/Heptane (4/1 weight ratio).

Comparative Example 8 (CE-8)

CE-8 was a 10 wt. % solution of THV-tp (tetrafluoroethylene, hexafluoropropylene, vinylidene fluoride thermoplastic terpolymer) in MEK.

Example 8 (EX-8)

The solutions of CE-7 and CE-8 were blended to achieve a 3:1 weight ratio of FS-1:THV-tp at 10 wt. % solids in the solvent mixture.

Example 9 (EX-9)

The solutions of CE-7 and CE-8 were blended to achieve a 1:1 weight ratio of FS-1:THV-tp at 10 wt. % solids in the solvent mixture.

Example 10 (EX-10)

The solutions of CE-7 and CE-8 were blended to achieve a 1:3 weight ratio of FS-1:THV-tp at 10 wt. % solids in the solvent mixture.

Each of these solvent-based release compositions was coated onto a polyester film using a Number 10 Meyer rod. The coated samples were then cured for 10 minutes at 120° C. The resulting release liners were evaluated using a silicone adhesive to determine release and readhesion properties.

PET-backed silicone adhesive tapes were prepared using ADH-1. Samples were prepared using both the Dry Lamination process and the Wet Casting process. The resulting samples were aged for three days at either 22° C. and 50% relative humidity ("3d-RT"), or at 70° C. ("3d-HT"). The peel force was measured according to the Release Test and the readhesion force of the adhesives peeled from the liners was evaluated using the Readhesion Test. The results are summarized in Tables 5a and 5b.

TABLE 5a

Release and Readhesion results for dry laminated ADH-1 adhesive and a blend of a fluorosilicone release polymer and a thermoplastic fluoroolefin-based polymer.

| Release material | FS1:THV-tp | Release (g/25 mm) 3d-RT | Release (g/25 mm) 3d-HT | Readhesion (g/25 mm) 3d-RT | Readhesion (g/25 mm) 3d-HT |
|---|---|---|---|---|---|
| CE-7 | 1:0 | 10.1 | 15.1 | 1,910 | 1,750 |
| EX-8 | 3:1 | 12.1 | 16.9 | 1,820 | 1,660 |
| EX-9 | 1:1 | 12.7 | 15.9 | 1,720 | 1,490 |
| EX-10 | 1:3 | 22.8 | 42.0 | 1,590 | 1,420 |
| CE-8 | 0:1 | Locked-up | Locked-up | Locked-up | Locked-up |

TABLE 5b

Release and Readhesion results for wet cast ADH-1 adhesive and a blend of a fluorosilicone release polymer and a thermoplastic fluoroolefin-based polymer.

| Release material | FS1:THV-tp | Release (g/25 mm) 3d-RT | Release (g/25 mm) 3d-HT | Readhesion (g/25 mm) 3d-RT | Readhesion (g/25 mm) 3d-HT |
|---|---|---|---|---|---|
| CE-7 | 1:0 | 22.6 | 28.9 | 1,860 | 2,140 |
| EX-8 | 3:1 | 26.6 | 34.0 | 1,710 | 2,200 |
| EX-9 | 1:1 | 13.3 | 23.7 | 1,780 | 2,040 |
| EX-10 | 1:3 | 6.1 | 11.2 | 1,700 | 2,170 |
| CE-8 | 0:1 | Locked-up | Locked-up | Locked-up | Locked-up |

Both the dry laminated and wet cast samples prepared using the release liner of CE-8 locked-up, i.e., the adhesive tape could not be removed from the liner. Thus, although the tetrafluoroethylene, hexafluoropropylene, vinylidene fluoride thermoplastic terpolymer alone did not function as a release material, good release was obtained even when significant amounts of the THV-tp were blended with the fluorosilicone, e.g., 1:3 of FS1:THV-tp.

Comparative Example 9 (CE-9)

FS-2 (94 parts by weight Q2-7786 and 6 parts by weight Q2-7560 crosslinker) was diluted to a 10 wt. % solution in EtOAc/Heptane (4/1 weight ratio). Initially, this solution dewet the PET film substrate. However, after aging, the solution wet the substrate and could be used to form a test liner.

Example 11 (EX-11)

The 10 wt. % solution of CE-9 (90 parts by weight) was combined with a 10 wt. % solution of THV-tp in MEK (CE-8, 10 parts by weight) resulting in a weight ratio of FS-2:THV of 9:1.

Example 12 (EX-12)

The 10 wt. % solution of CE-9 (80 parts by weight) was combined with a 10 wt. % solution of THV-tp in MEK (CE-8, 20 parts by weight) resulting in a weight ratio of FS-2:THV of 4:1.

Example 13 (EX-13)

The 10 wt. % solution of CE-9 (50 parts by weight) was combined with a 10 wt. % solution of THV-tp in MEK (CE-8, 50 parts by weight) resulting in a weight ratio of FS-2:THV of 1:1.

PET-backed silicone adhesive tapes were prepared using ADH-1. Samples were prepared using both the Dry Lamination process and the Wet Casting process. The resulting samples were aged for seven days at either 22° C. and 50% relative humidity ("7d-RT"), or at 70° C. ("7d-HT"). The peel force was measured according to the Release Test and the readhesion force of the adhesives peeled from the liners was evaluated using the Readhesion Test. The results are summarized in Tables 6a and 6b.

TABLE 6a

Release and Readhesion results for dry laminated ADH-1 adhesive a blend of a fluorosilicone release polymer and a thermoplastic fluoroolefin-based polymer.

| Release material | FS2:THV-tp | Release (g/25 mm) 7d-RT | Release (g/25 mm) 7d-HT | Readhesion (g/25 mm) 7d-RT | Readhesion (g/25 mm) 7d-HT |
|---|---|---|---|---|---|
| CE-9 | 1:0 | 11.4 | 12.4 | 1,450 | 1,550 |
| EX-11 | 9:1 | 8.9 | 10.3 | 2,090 | 2,320 |
| EX-12 | 4:1 | 8.0 | 9.3 | 2,120 | 2,190 |
| Ex-13 | 1:1 | 5.7 | 7.4 | 1,680 | 1,930 |

TABLE 6b

Release and Readhesion results for wet cast ADH-1 adhesive a blend of a fluorosilicone release polymer and a thermoplastic fluoroolefin-based polymer..

| Release material | FS2:THV-tp | Release (g/25 mm) 7d-RT | Release (g/25 mm) 7d-HT | Readhesion (g/25 mm) 7d-RT | Readhesion (g/25 mm) 7d-HT |
|---|---|---|---|---|---|
| CE-9 | 1:0 | 9.0 | 20.0 | 1,640 | 1,750 |
| EX-11 | 9:1 | 16.6 | 29.5 | 2,260 | 2,300 |
| EX-12 | 4:1 | 15.0 | 32.8 | 2,120 | 2,240 |
| Ex-13 | 1:1 | 7.3 | 14.3 | 1,740 | 1,900 |

Comparative Examples using a non-linear fluoroacrylate polymer.

C4 MH-PEGDA. A copolymer of C4 MH and a difunctional acrylate (PEGDA) was prepared as described in U.S. Pat. No. 7,279,210 and diluted to 10% solids in a 95:5 blend of EtOAc and DMF.

Comparative Example 10 (CE-10)

Portions of the 10 wt. % solution of FS-1 in EtOAc/heptane (4:1 ratio) ("SOLN-3") and the 10 wt. % solution of C4 MH-PEGDA in EtOAc/DMF (95:5) ("SOLN-4") were combined resulting at a weight ratio of FS-1 to C4 MH-PEGDA of 3:1.

Comparative Example 11 (CE-11)

SOLN-3 and SOLN-4 were combined resulting in a weight ratio of FS-1 to C4 MH-PEGDA of 1:1.

Comparative Example 12 (CE-12)

SOLN-3 and SOLN-4 were combined resulting in a weight ratio of FS-1 to C4 MH-PEGDA of 1:3.

Each of these release compositions was coated onto a polyester film using a Number 10 Meyer rod. The coated samples were then cured for 10 minutes at 150° C., except for CE-10 which was cured for 10 minutes at 120° C.

PET-backed silicone adhesive tapes were prepared using ADH-1. Samples were prepared using both the Dry Lamination process and the Wet Casting process. The resulting samples were aged for three days at either 22° C. and 50% relative humidity ("3d-RT"), or at 70° C. ("3d-HT"). The peel force was measured according to the Release Test and the readhesion force of the adhesives peeled from the liners was evaluated using the Readhesion Test. The results are summarized in Tables 7a and 7b. The results for CE-7, which uses unblended FS1 as a fluorosilicone release material, are included for comparison.

TABLE 7a

Release and Readhesion results for dry laminated ADH-1 adhesive and a blend of a fluorosilicone release polymer and a non-linear fluoroacrylate derived from a fluoroacrylate monomer and a multi-(meth)acrylate.

| Release material | FS1:C4MH-PEGDA | Release (g/25 mm) | | Readhesion (g/25 mm) | |
|---|---|---|---|---|---|
| | | 3d-RT | 3d-HT | 3d-RT | 3d-HT |
| CE-7 | 1:0 | 10.1 | 15.1 | 1,910 | 1,750 |
| CE-10 | 3:1 | 13.8 | 15.9 | 1,870 | 1,700 |
| CE-11 | 1:1 | 88.0 | 110 | 1,740 | 1,890 |
| CE-12 | 1:3 | 92.8 | 89.3 | 1,690 | 1,660 |

TABLE 7b

Release and Readhesion results for wet cast ADH-1 adhesive and a blend of a fluorosilicone release polymer and a non-linear fluoroacrylate derived from a fluoroacrylate monomer and a multi-(meth)acrylate.

| Release material | FS1:C4MH-PEGDA | Release (g/25 mm) | | Readhesion (g/25 mm) | |
|---|---|---|---|---|---|
| | | 3d-RT | 3d-HT | 3d-RT | 3d-HT |
| CE-7 | 1:0 | 22.6 | 28.9 | 1,860 | 2,140 |
| CE-10 | 3:1 | 24.5 | 29.5 | 1,740 | 2,130 |
| CE-11 | 1:1 | 2028 | 1960 | 1,420 | 1,590 |
| CE-12 | 1:3 | 1769 | 1274 | 830 | 1,830 |

Example 14 (EX-14)

A fluoroolefin-based elastomeric TFE/VF2 copolymer (available under the trade name KYNAR 7201 from Elf Atochem North America, Inc., Pennsylvania) was dissolved in MEK to give a 10 wt. % solution. This solution was combined with a 10 wt. % solution of FS-2 (94 parts by weight Q2-7786 and 6 parts by weight Q2-7560 crosslinker) in EtOAc/Heptane (4/1 ratio by weight). The weight ratio of FS-1 to elastomeric fluoroolefin copolymer in the resulting blend was 1:1.

Example 15 (EX-15)

THV-el, an fluoroolefin-based elastomeric tetrafluoroethylene, hexafluoropropylene, vinylidene fluoride terpolymer (available under the trade name FT-2430 from Dyneon LLC), was dissolved in MEK to give a 10 wt. % solution. This solution was combined with 10 wt. % solution of FS-2 (94 parts by weight Q2-7786 and 6 parts by weight Q2-7560 crosslinker) in EtOAc/Heptane (4/1 ratio by weight). The weight ratio of FS-1 to elastomeric fluoroolefin terpolymer in the resulting blend was 1:1.

Each of these release compositions was coated onto a polyester film using a Number 10 Meyer rod. The coated samples were then cured for 10 minutes at 120° C.

PET-backed silicone adhesive tapes were prepared using ADH-1. Samples were prepared using both the Dry Lamination process and the Wet Casting process. The resulting samples were aged for three days at either 22° C. and 50% relative humidity ("3d-RT"), or at 70° C. ("3d-HT"). The peel force was measured according to the Release Test and the readhesion force of the adhesives peeled from the liners was evaluated using the Readhesion Test. The results are summarized in Table 8.

TABLE 8

Release and Readhesion results using the ADH-1 adhesive and a 1:1 blend of a fluorosilicone release polymer and an elastomeric fluoroolefin-based polymer.

| Release material | Preparation method | Release (g/25 mm) | | Readhesion (g/25 mm) | |
|---|---|---|---|---|---|
| | | 3d-RT | 3d-HT | 3d-RT | 3d-HT |
| EX-14 | Dry lam. | 9.6 | 14.3 | 2,190 | 2,220 |
| EX-14 | Wet cast | 6.7 | 11.5 | 1,890 | 2,130 |
| EX-15 | Dry lam. | 7.1 | 10.8 | 2,020 | 2,190 |
| EX-15 | Wet cast | 8.1 | 11.1 | 1,830 | 2,160 |

Example 16 (EX-16)

A 1:1 blend by weight of FS-1 and C4 MH-ODA fluoropolymer (70:30 by weight) was prepared as a 16 wt. % solution in a solvent blend of EtOAc, toluene, and heptane.

Example 17 (EX-17)

A 1:1 blend by weight of FS-1 and THV-tp fluoropolymer was prepared as a 10 wt. % solution in a solvent blend of EtOAc, MEK, and heptane.

Each of these release compositions was coated onto a polyester film and cured. PET-backed silicone adhesive tapes were prepared using ADH-4. Samples were prepared using the Dry Lamination process. The resulting samples were aged for three days at either 22° C. and 50% relative humidity ("3d-RT"), or at 70° C. ("3d-HT"). The peel force was measured according to the Release Test and the readhesion force of the adhesives peeled from the liners was evaluated using the Readhesion Test. The results are summarized in Table 9.

TABLE 9

Release and Readhesion results using adhesive ADH-4.

| Release material | 1:1 wt. ratio with FS-1 | Release (g/25 mm) 3d-RT | Release (g/25 mm) 3d-HT | Readhesion (g/25 mm) 3d-RT | Readhesion (g/25 mm) 3d-HT |
|---|---|---|---|---|---|
| EX-16 | C4MH-ODA | 8.9 | 11.7 | 1,340 | 1,840 |
| EX-17 | THV-tp | 12.2 | 15.9 | 1,150 | 1,350 |

Copolymers of C4 MH with other acrylates and with vinyl acetate were prepared as follows.

C4 MH/BA/ODA. A copolymer of C4 MH (70 wt. %), butyl acrylate (BA, 10 wt. %), and octadecyl acrylate (ODA, 20 wt. %) was prepared by reacting 23.33 g of a 30 wt. % C4 MH solution in EtOAc (7.0 g solid, MW=723, 9.68 mmol), with 1.0 g BA, and 2.0 g ODA (MW=324.55, 6.16 mmol) in 13.67 g EtOAc in the presence of 0.050 g 2,2'-azobis(2-methylbutyronitrile) (available under the trade name Vazo-67, from DuPont). A magnetic stir bar was added. The solution was bubbled with nitrogen for one minute. The sealed bottle was put in a 70° C. oil bath and polymerized while stirring for 24 hours. From FTIR, no acrylate signal was observed. The 25% solution was diluted with EtOAc to 10% for later formulation.

C4 MH/BMA. Similarly, a copolymer of C4 MH (70 wt. %) and butyl methacrylate (BMA, 30 wt. %) was prepared by reacting 7.0 g C4 MH (23.33 g 30% in EtOAc solution) with 3.0 g BMA in 23.67 g EtOAc in the presence of 0.05 g 2,2'-azobis(2-methylbutyronitrile) at 70° C. for 24 hours. From FTIR, no acrylate signal was observed. The resulting 25% solution was diluted with EtOAc to 10% for later formulation.

C4 MH/IOA. A copolymer of C4 MH (80 wt. %) and isooctyl acrylate (IOA, 20 wt. %) was prepared according to Example 24 of U.S. Pat. No. 7,199,197.

C4 MH/VA. A copolymer of C4 MH (60 wt. %) and vinyl acetate (VA, 40 wt. %) was prepared by reacting 6.0 g C4 MH (20 g 30 wt. % in EtOAc solution) and 4.0 g vinyl acetate (VA) in 16 g EtOAc in the presence of 0.05 g 2,2'-azobis(2-methylbutyronitrile). The solution was bubbled with nitrogen for one minute. The sealed bottle was polymerized in a 70° C. oil bath and polymerized with a magnetic stirring for 24 hours. From FTIR, no acrylate signal was observed. The 25 wt. % solution was diluted with EtOAc to 10 wt. % for further formulation.

The linear fluorinated copolymers were then blended with the FS-2 fluorosilicone (94 parts by weight Q2-7786 and 6 parts by weight Q2-7560 crosslinker; 10 wt. % in EtOAc/Heptane at a 4/1 ratio by weight) as summarized in Table 10.

TABLE 10

Linear fluorinated copolymer compositions.

| | Fluoroacrylate | | Blend weight % | |
|---|---|---|---|---|
| Ex. | Composition | wt. ratio | Fluoroacrylate | FS-2 |
| EX-18 | C4MH/BA/ODA | 70:10:20 | 50 | 50 |
| EX-19 | C4MH/IOA | 80:20 | 50 | 50 |
| EX-20 | C4MH/IOA | 80:20 | 60 | 40 |
| EX-21 | C4MH/BMA | 70:30 | 50 | 50 |
| EX-22 | C4MH/VA | 60:40 | 50 | 50 |

The resulting blends were coated onto a polyester film using a Number 10 Meyer rod and cured at 120° C. for 10 minutes. PET-backed silicone adhesive tapes were prepared using ADH-1. The resulting samples were aged for seven days at either 22° C. and 50% relative humidity ("7d-RT"), or at 70° C. ("7d-HT"). The peel force was measured according to the Release Test and the readhesion force was evaluated using the Readhesion Test, as summarized in Table 11. For comparison, a sample of the PET-backed tape was laminated directly to a stainless steel panel. The adhesive of this tape was never in contact with a release material. This readhesion force was 1,620 g/25 mm.

TABLE 11

Release and Readhesion results using dry laminated adhesive ADH-1.

| Ex. | Wt. ratio of FS1:linear fluoropolymer | Release (g/25 mm) 7d-RT | Release (g/25 mm) 7d-HT | Readhesion (g/25 mm) 7d-RT | Readhesion (g/25 mm) 7d-RT |
|---|---|---|---|---|---|
| EX-18 | 1:1 | 9.9 | 15.3 | 1,510 | 1,770 |
| EX-19 | 1:1 | 4.2 | 7.3 | 1,030 | 1,400 |
| EX-20 | 2:3 | 5.0 | 7.7 | 1,400 | 1,460 |
| EX-21 | 1:1 | 4.9 | 6.6 | 1,340 | 1,680 |
| EX-22 | 1:1 | 3.4 | 6.9 | 1,380 | 1,510 |

Figure 2:
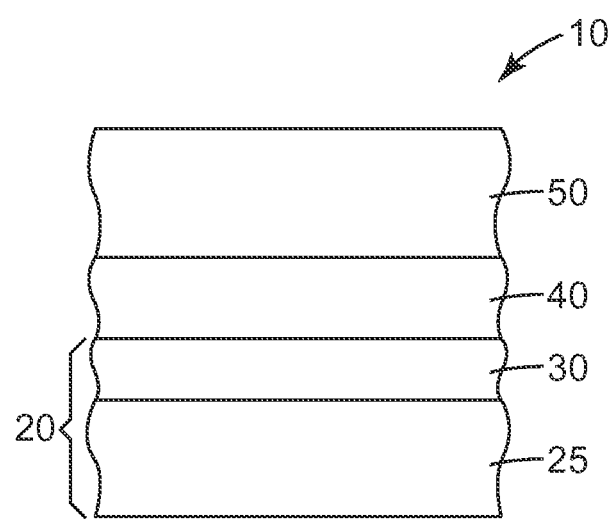
FIG. 2 illustrates an adhesive article according to some embodiments of the present disclosure.

The release compositions of the present disclosure may be used to form release liners such as those used with adhesive articles such as tapes and labels. An exemplary release liner is shown in FIG. 1. Release liner 20 includes first substrate 25 and release layer 30 bonded to first major surface 21 of substrate 20. In some embodiments, a second release layer may be bonded to second major surface 22 of substrate 20. An exemplary adhesive article is shown in the FIG. 2. Adhesive article 10 includes release liner 20 comprising first substrate 25 and release layer 30 bonded to the first major surface of first substrate 25. Adhesive article 10 also includes adhesive layer 40 in contact with release layer 30. In some embodiments, second substrate 50 is adhered to adhesive layer 40. In some embodiments, an adhesive article may be wound upon itself or sections of the adhesive article may be stacked upon each other such that adhesive layer 40 comes into contact with the second major surface of first substrate 25, which may be coated with another release layer. This optional second release layer may be independently selected from the first release layer. In some embodiments, the second release layer may comprise a fluoro-functional silicone release polymer; e.g., a release material according to the present disclosure.

Exemplary adhesive articles include adhesive transfer tapes, stretch-release articles, single- and double-coated tapes including foam core tapes; self-wound tapes, label stocks, and dual-linered constructions. In some embodiments, the release layer and, optionally the underlying substrate, may be embossed. In some embodiments, the release materials of the present disclosure may also be used as water and/or oil repellant coatings.

Various modifications and alterations of this invention will become apparent to those skilled in the art without departing from the scope and spirit of this invention.

What is claimed is:

1. A release material comprising a blend of a fluoro-functional silicone release polymer and a linear fluoroacrylate polymer, wherein the linear fluoroacrylate polymer is derived from at least one monomer defined by the formula

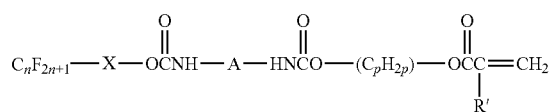

wherein, n is an integer in a range of from 1 to 6, inclusive;
p is an integer in a range of from 2 to 30, inclusive;
R' is H, CH$_3$, or F; and
X is

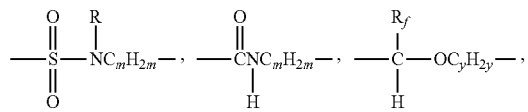

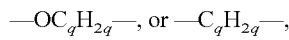, or —C$_q$H$_{2q}$—, wherein: R is hydrogen or an alkyl group having 1 to 4 carbon atoms;
m is an integer in a range of from 2 to 8, inclusive;
R$_f$ is C$_n$F$_{2n+1}$;
y is an integer in a range of from 0 to 6, inclusive; and
q is an integer in a range of from 1 to 8, inclusive; and
wherein A represents a hydrocarbylene group.

2. The release material of claim 1, wherein the weight ratio of the fluoro-functional silicone release polymer to the linear fluoropolymer polymer is between 10:1 and 1:20.

3. The release material according to claim 1, wherein the fluoroacrylate polymer is derived from at least one C4 MH monomer defined by the formula

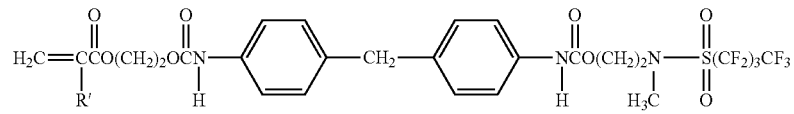

wherein R' is hydrogen.

4. The release material of claim 3, wherein the linear fluoropolymer comprises a copolymer of the C4 MH monomer and at least one mono-(meth)acrylate.

5. A release liner comprising a substrate and the release material according to claim 1 bonded to at least one major surface of the substrate.

6. An adhesive article comprising an adhesive having a first major surface and a second major surface, wherein the first major surface of the adhesive is in contact with the release material claim 1.

7. The adhesive article according to claim 6, wherein the adhesive comprises a silicone adhesive.

8. The adhesive article of claim 7, wherein the silicone adhesive comprises a poly (diorganosiloxane).

9. The adhesive article according to claim 7, wherein the silicone adhesive comprises a polydiorganosiloxane-polyurea block copolymer.

10. The adhesive article according to claim 7, wherein the silicone adhesive comprises a polydiorganosiloxane-polyoxamide copolymer.

11. A coating comprising the release material according to claim 1.

* * * * *

UNITED STATES PATENT AND TRADEMARK OFFICE
CERTIFICATE OF CORRECTION

Page 1 of 3

PATENT NO. : 8,568,848 B2
APPLICATION NO. : 13/139378
DATED : October 29, 2013
INVENTOR(S) : Jayshree Seth et al.

It is certified that error appears in the above-identified patent and that said Letters Patent is hereby corrected as shown below:

On the title page item (57), Col. 2 (Abstract):
Line 5, delete "fluoroacryaltes." and insert -- fluoroacrylates. --

In the Specification:
Column 5
Line 34, delete ""C4 MH"." and insert -- "C4MH". --

Column 7
Line 53, delete "methyethyl" and insert -- methylethyl --

Column 8
Line 66, delete "C4 MH" and insert -- C4MH --

Column 9
Line 1, delete "C4 MH-ODA" and insert -- C4MH-ODA --

Line 9, delete "C4 MH-ODA" and insert -- C4MH-ODA --

Line 12, delete "FS-1:C4 MH-ODA" and insert -- FS-1:C4MH-ODA --

Line 18, delete "FS-1:C4 MH-ODA" and insert -- FS-1:C4MH-ODA --

Line 25, delete "FS-1:C4 MH-ODA" and insert -- FS-1:C4MH-ODA --

Column 10
Line 23, delete "C4 MH-ODA" and insert -- C4MH-ODA --

Line 27, delete "FS1:C4 MH-ODA" and insert -- FS-1:C4MH-ODA --

Signed and Sealed this
Sixteenth Day of September, 2014

Michelle K. Lee
*Deputy Director of the United States Patent and Trademark Office*

Column 10
Line 64, delete "C4 MH-ODA" and insert -- C4MH-ODA --

Line 66, delete "C4 MH-ODA" and insert -- C4MH-ODA --

Line 67, delete "C4 MH-ODA" and insert -- C4MH-ODA --

Column 11
Line 32, delete "C4 MH-ODA" and insert -- C4MH-ODA --

Line 39, delete "C4 MH-ODA" and insert -- C4MH-ODA --

Line 40, delete "FS-2:C4 MH-ODA" and insert -- FS-2:C4MH-ODA --

Line 47, delete "C4 MH-ODA" and insert -- C4MH-ODA --

Line 48, delete "FS-2:C4 MH-ODA" and insert -- FS-2:C4MH-ODA --

Line 54, delete "C4 MH-ODA" and insert -- C4MH-ODA --

Line 56, delete "FS-2:C4 MH-ODA" and insert -- FS-2:C4MH-ODA --

Line 63, delete "C4 MH-ODA" and insert -- C4MH-ODA --

Line 64, delete "FS-2:C4 MH-ODA" and insert -- FS-2:C4MH-ODA --

Column 14
Line 58, delete "polymer.." and insert -- polymer. --

Column 15
Line 3, delete "C4 MH-PEGDA" and insert -- C4MH-PEGDA --

Line 3, delete "C4 MH" and insert -- C4MH --

Lines 11-12, delete "C4 MH-PEGDA" and insert -- C4MH-PEGDA --

Line 13, delete "C4 MH-PEGDA" and insert -- C4MH-PEGDA --

Line 20, delete "C4 MH-PEGDA" and insert -- C4MH-PEGDA --

Line 25, delete "C4 MH-PEGDA" and insert -- C4MH-PEGDA --

Column 16
Line 65, delete "C4 MH-ODA" and insert -- C4MH-ODA --

Column 17
Line 27, delete "C4 MH" and insert -- C4MH --

CERTIFICATE OF CORRECTION (continued)
U.S. Pat. No. 8,568,848 B2

Column 17
Line 29, delete "C4 MH/BA/ODA." and insert -- C4MH/BA/ODA. --

Line 29, delete "C4 MH" and insert -- C4MH --

Lines 31-32, delete "C4 MH" and insert -- C4MH --

Line 55, delete "C4 MH/BMA." and insert -- C4MH/BMA. --

Line 55, delete "C4 MH" and insert -- C4MH --

Line 57, delete "C4 MH" and insert -- C4MH --

Line 63, delete "C4 MH/IOA." and insert -- C4MH/IOA. --

Line 63, delete "C4 MH" and insert -- C4MH --

Line 66, delete "C4 MH/VA." and insert -- C4MH/VA. --

Line 66, delete "C4 MH" and insert -- C4MH --

Line 67, delete "C4 MH" and insert -- C4MH --

In the Claims:
Column 20
Line 27, in claim 2, delete "fluoropolymer polymer" and insert -- fluoroacrylate polymer --

Line 29, in claim 3, delete "C4 MH" and insert -- C4MH --

Line 42, in claim 4, delete "C4 MH" and insert -- C4MH --

Line 50, in claim 6, after "material" insert -- of --